United States Patent [19]

Hug et al.

[11] 3,880,942

[45] Apr. 29, 1975

[54] SURFACE CRYSTALLIZATION PROCESS

[75] Inventors: Delmar O. Hug, Edwardsville; Taniel A. Garabedian, Belleville, both of Ill.

[73] Assignee: Monsanto Company, St. Louis, Mo.

[22] Filed: June 7, 1973

[21] Appl. No.: 368,005

Related U.S. Application Data

[63] Continuation-in-part of Ser. No. 150,719, June 7, 1971, abandoned.

[52] U.S. Cl. ............................................... 260/646
[51] Int. Cl. ............................................. C07c 79/12
[58] Field of Search ...................................... 260/646

[56] References Cited
UNITED STATES PATENTS

| | | | |
|---|---|---|---|
| 3,050,786 | 8/1962 | St. John et al. | 165/133 |
| 3,067,270 | 12/1962 | Weedman | 260/674 |
| 3,228,456 | 1/1966 | Brown et al. | 165/1 |
| 3,272,875 | 9/1966 | Gordon et al. | 260/646 |
| 3,311,666 | 3/1967 | Dunn | 260/646 |
| 3,380,513 | 4/1968 | Staats | 165/1 |

*Primary Examiner*—Leland A. Sebastian
*Attorney, Agent, or Firm*—N. E. Willis; J. E. Maurer; F. D. Shearin

[57] ABSTRACT

Improved purity is achieved in a process for separating the isomers of nitro- and halo-substituted aromatic compounds in a mixture of liquid isomers by fractional, surface crystallization from the melt, wherein the isomeric mixture is cooled until crystals form on a cooling surface. The improvement comprises conducting the fractional, surface crystallization on a polymeric, e.g., polytetrafluoroethylene, cooling surface. The process is particularly beneficial for separating para-nitrochlorobenzene from a liquid isomeric liquid of ortho-, meta- and para-nitrochlorobenzenes.

2 Claims, No Drawings

SURFACE CRYSTALLIZATION PROCESS

This application is a continuation-in-part of application Ser. No. 150,719, filed June 7, 1971 and now abandoned.

BACKGROUND OF THE INVENTION

The present invention relates to crystallization processes, and more specifically relates to separating isomers from a mixture of isomers using crystallization from melt.

The separation of chemical compounds and chemical isomers by means of crystallization is widely used in American industry. While many separations can be made by distillation or by solvent extraction, there are cases where these methods are impractical, and the desired separation can be achieved more advantageously by means of crystallization. In the case of chemical isomers having physical and chemical properties, or in the case of thermally unstable substances, separation by crystallization may be the only method that can be advantageously employed.

As part of the process for manufacturing organic compounds, such as nitro- and halo-substituted aromatic compounds, the problem of separating isomers and homologs of these compounds in high purity is a major problem. Industry has been interested in obtaining pure forms of these isomers or homologs, since these materials frequently have different chemical or biological properties that make them particularly desirable in many applications. As an example, para-nitrochlorobenzene is used in the manufacture of disodium-benzenemeta-disulfonate, para-aminophenol, various pharmaceuticals and a variety of anti-oxidants and gum inhibitors. On the other hand, ortho-nitrochlorobenzene is used as an intermediate in the synthesis of ortho-aminophenol, dyestuffs intermediate and photographic developer, chrome-dyestuffs intermediate, and many other intermediate chemicals. It is also used as a solvent in synthetic-petroleum processes. Furthermore, the isomers of nitrochlorobenzene have been very difficult to obtain in high purity because their separation by distillation is extremely difficult due to the closeness of their boiling points, and prior art processes for separating these isomers by crystallization have produced products having a purity of only about 95%.

Crystallization processes can be carried out either in the presence of a solvent, called crystallization from solution, or in the absence of a solvent, called crystallization from melt. Crystallation from solution separates the components in a mixture by using the differences in solubility at specific temperatures. Crystallization from melt, on the other hand, makes use of the differences in crystallizing points. In the latter case the melt liquor, which is at a temperature where all of the components are soluble in the melt, is gradually cooled until crystals with the highest crystallizing point are formed. Thereafter, the solid crystals with the highest crystallizing point are separated from the melt liquor.

There are two types of fractional crystallization, namely, suspension crystallization and surface crystallization. In suspension crystallization the crystals are formed in the mother liquor and subsequently separated from the mother liquor such as by filtration or centrifugation. In surface crystallization, the crystals form or nucleate on a cooled surface and the mother liquor is separated from the cooled surface containing the crystals. On a commercial basis surface crystallization is widely used for various separations, such as for the separation of isomers and chemical homologs.

Despite the fact that the art of processes for surface crystallization of isomers is well developed, the prior art fails in one or more ways to teach the advantages of the present invention. As will be seen from the following description, it has been surprisingly found that the process of the present invention provides higher quality crystals with increased purity than can be obtained by means of the prior art processes.

SUMMARY OF THE INVENTION

It is an object of the present invention to provide an improved process for the separation of isomers by surface crystallization. Another object of the present invention is to provide an improved process for the separation of isomers of nitro- and halo-substituted aromatic compounds by surface crystallization. Another object of the present invention is to provide an improved process for the separation of para-nitrochlorobenzene from a liquid isomeric mixture of ortho-meta-, and para-nitrochlorobenzenes by surface crystallization.

These and other objects are provided in a process for separating the isomers of nitro- and halo-substituted aromatic compounds in a liquid isomeric mixture by surface crystallization from the melt wherein the isomer mixture is cooled until crystals form on a cooling surface, the improvement comprising conducting the surface crystallization on a cooling surface of polymeric material.

The nitro- and halo-substituted aromatic compounds to which this invention pertains include a number of compounds such as nitrochlorobenzene, nitrofluorobenzene, nitrobromobenzene, nitrochloronaphthalene, nitrobromonaphthalene, dinitrochlorobenzene, dinitrofluorobenzene, dinitrobromobenzene, dinitroiodobenzene, dinitrochloronaphthalene, dinitrofluoronaphthalene, dinitrobromonapthalene, dinitroiodonaphthalene, dichloronitrobenzene, difluoronitrobenzene, dibromonitrobenzene, diiodonitrobenzene, nitrofluorochlorobenzene, nitrochlorobromobenzene and the like. The process has been found to be particularly effective to separate the isomers of nitrochlorobenzene.

Any number of polymeric materials can be used in the process of the present invention as will occur to those skilled in the art. However, it is known that certain polymeric materials may be soluble in various organic compounds, especially aromatic compounds, that are being crystallized, and these polymeric materials should be avoided. Suitable polymeric materials include polytetrafluoroethylene, polypropylene, polyethylene, polycarbonates, polyvinyl chloride, polytrifluorochloroethylene, a copolymer of hexafluoropropylene and tetrafluoroethylene, polyvinylidene chloride, cellulose, cellulose acetate, cellulose acetate butyrate and hexafluoropropylene, and the like. Polytetrafluoroethylene is preferred.

Broadly described, the isomers of nitro- and halo-substituted aromatic compounds are separated by surface crystallization according to the improved process of this invention by introducing an isomeric mixture to be separated into a vessel containing a cooling surface, maintaining the temperature of the cooling surface at such a temperature to deposit the isomer on the cooling surface, separating the cooling surface containing the isomer from the remaining liquid mixture, and then recovering the isomer from the cooling surface. In the present invention, improved isomer purity is achieved by using a cooling surface of polymeric material.

In a typical crystallization process using surface crystallization from melt, the isomer mixture to be separated is introduced to a vessel containing a cooling surface. The vessel need not be of any particular size or shape. The walls of the vessel can act as the cooling surface or alternatively, a cooling surface can be mounted within the vessel. In a typical surface crystallization apparatus the cooled surface which contacts the mother liquor is usually a tube, and traditionally, a metal tube. The tubes thus provide cold surfaces upon which the crystals can form. Conventional tube heat exchangers with a plurality of tubes can be employed for surface crystallization. It has been found to be convenient to use a vessel containing cooling tubes therein for the process of this invention and this is the appratus we prefer. By way of illustration and not by way of limitation, a specific embodiment of a vessel and cooling tube which can be covered with polymeric material for use in the present process is shown in U.S. Pat. No. 3,219,722, issued Nov. 23, 1965.

Sufficient feed stock is then passed into the vessel to immerse a major proportion of the cooling surface. If the flow of the isomeric mixture is discontinued, it is customary to agitate the liquid in the vessel. However, in some instances the liquid in the vessel is permitted to remain substantially static while crystallization proceeds. Alternatively, a given batch of mixture can be continually circulated into and out of the crystallizer vessel by means of an external pump thus causing the liquid to pass over the cooling surface in a continuous manner. It was further discovered that the improved results achieved by the present process are obtained whether the flow of isomeric mixture is parallel to or perpendicular to the surface of the cooling surface. In addition, it was found that the purity of the desired isomer obtained by the present process was achieved whether the isomeric mixture was agitated mechanically within the vessel, or allowed to remain static within the vessel, or was circulated through the vessel by an external pump.

The temperature of the cooled surface is maintained at the temperature necessary to deposit the isomer. Any number of means well known to those skilled in the art can be used to maintain the necessary temperature. As an example, if the walls of the vessel are used as the cooling surface, the temperature of the walls can be controlled by various heaters, various coolants or a combination of heating means and cooling means. In a typical surface crystallization appratus the cooled surface which contacts the isomeric mixture usually comprises cooling conduits in the form of tubes in which the cold surfaces upon which the isomer can deposit are cooled by passing a coolant through the cooling conduits. The coolant can be any fluid medium that will provide the necessary cooling of the feed stock or the mother liquor. Representative coolants are precooled fluids such as water, brine, mother liquor, methanol and the like; evaporative coolants, such as fluorinated hydrocarbons, propane, ammonia and the like; or gases, such as air, nitrogen or the like.

The cooling surfaces can be covered with polymeric material by any number of means known to those skilled in the art. The cooling surface can be coated by immersing the surface in a molten bath of the polymeric material, or in a solution of the polymeric material and permitting the solvent to evaporate. Alternatively, the polymeric material can be applied to the surface as a powder or spray. Then, the surface can be heated in a furnace to fuse the polymeric particles and convert them to an impervious coating. The cooling surface can also be coated by spraying molten polymeric material against the surface using a plasma arc spray or the like. On the other hand, when the cooling surface is a metal tube which is removable from the crystallizer vessel in straight cylinderical sections, a close-fitting tube of polymeric material can be conveniently slipped over the metal tube, and the double-tube assembly can then be reinstalled in the crystallizer vessel. Where the metal tube configuration does not permit the installation of an integral tube, a split-tube design can be employed. Thus, two longitudinal halves of a tube of polymeric material of appropriate length can be applied to the metal tube.

Considerable range is permitted in the thickness of the tubing or coating of polymeric material which can be employed in the process of this invention. Conveniently, the thickness can range from about 0.5 to about 5 times of the thickness of conventional metal tubes. Since thermal conductivity is a function of material thickness, the thickness may be dictated by the characteristics of the coolant supply system, e.g., the nature of the coolant, the rate of coolant flow and the coolant temperature.

After the isomer has deposited on the cooling surface, the cooling surface containing the isomer is separated from the remaining liquid mixture by any number of means known to the art. If the cooling surface is removably mounted in the crystallizer vessel, the cooling surface containing the deposited isomer can be removed mechanically from the crystallizer vessel and the remaining liquid mixture. On the other hand, if the cooling surface is permanently mounted on the crystallizer vessel, or is difficult to remove from the crystallizer vessel, which is the case in a typical crystallizer appratus, the remaining liquid mixture is drained away from the cooling surface containing the deposited isomer.

After the cooling surface containing the deposited isomer is separated from the remaining liquid mixture, the deposited isomer can be recovered from the cooling surface by any number of means known to the art. As an example, the isomer can be scraped from the cooling surface mechanically. On the other hand, the cooling surface can be heated to a temperature above the melting point of the isomer to melt the isomer off the cooled surface and this is the procedure we prefer to use. In a typical crystallization process a heated fluid is passed through the cooling conduits, after the remaining liquid mixture is drained away from the cooling surface, to melt the deposited isomer which is then collected as the liquid.

DESCRIPTION OF THE PREFERRED EMBODIMENTS

To illustrate the substantial improvement in purity of the desired isomer which results from the use of the present process, numerous comparative crystallization tests were conducted on crude isomeric mixtures of nitrochlorobenzene. In each test the para isomer in the crude isomeric mixture was crystallized by a batch surface crystallization process similar to that hereinbefore described, i.e., employing a crystallizer vessel having an external circulating pump, cooling tubes within the vessel, and water flowing through the cooling tubes. Conventional steel tubes were used as the cooling surface except that one of the steel tubes was covered with a cylindrical sleeve of polytetrafluoroethylene having a thickness of approximately 2 milliliters. The temperature of the cooling water was gradually reduced during each test such that the temperature of the crude nitrochlorobenzene mixture was also reduced to achieve deposition of the para isomer on the cooling surface. The volume flow of the crude mixture through the recirculating loop could be varied from 5 to 15 gallons per minute. The preferred velocity of the crude mixture over the cooling tubes was about 0.08 feet per minute.

After the batch of crude mixture had circulated through the crystallizer for several hours, the crystal cake on a plain steel cooling tube was analyzed and compared to the analysis of the crystal cake on the steel cooling tube covered with polytetrafluoroethylene. In each case the para isomer of nitrochlorobenzene was present in greater amount in the crystal cake removed from the cooling tube covered with polytetrafluoroethylene. Furthermore, the usual "sweating" or "dripping effect", characteristically present on the metal tubes, was not found on the polymer-covered tube. In addition, the crystals of para-nitrochlorobenzene deposited on the polymer-covered tube were "icelike" in appearance, thus being physically distinguishable from the opaque crystals deposited on the conventional steel tube.

This invention is further illustrated by but not limited to the following examples which show the results of the above comparative tests.

EXAMPLE 1

About 38,650 grams of a crude nitrochlorobenzene mixture (90.00% para, 9.22% ortho and 0.78% meta) were circulated through the crystallizer for approximately 4⅓ hours while the temperature of the crude mixture was slowly reduced from 85.5°C. to 76.5°C. The nitrochlorobenzene crystals removed from a plain steel cooling tube were analyzed as 96.20% para, 0.56% ortho and 0.23% meta. The crystals removed from the polytetrafluoroethylene-covered cooling tube were analyzed as 99.77% para, 0.23% ortho and <0.05% meta.

EXAMPLE 2

About 38,650 grams of a crude nitrochlorobenzene mixture (90.00% para, 9.22% ortho and 0.78% meta) were circulated through the crystallizer for approximately 2 hours while the temperature of the crude mixture was slowly reduced from 85°C. to 78°C. The nitrochlorobenzene crystals removed from a plain steel cooling tube were analyzed as 93.69% para, 6.00% ortho and 0.31% meta. The crystals removed from the polytetrafluoroethylene-covered cooling tube were analyzed as 99.73% para, 0.27% ortho and <0.05% meta.

EXAMPLE 3

About 38,650 grams of a crude nitrochlorobenzene mixture (90.11% para, 9.10% ortho and 0.79% meta) were circulated through the crystallizer for approximately 5½ hours while the temperature of the crude mixture was slowly reduced from 85°C. to 75°C. The nitrochlorobenzene crystals removed from a plain steel cooling tube were analyzed as 97.83% para, 2.07% ortho and 0.10% meta. The crystals removed from the polytetrafluoroethylene-covered cooling tube were analyzed as 99.71% para, 0.29% ortho and 0% meta.

EXAMPLE 4

About 33,000 grams of a crude nitrochlorobenzene mixture (89.06% para, 9.96% ortho and 0.98% meta) were circulated through the crystallizer for approximately 2⅓ hours while the temperature of the crude mixture was slowly reduced from 86.2°C. to 77.0°C. The nitrochlorobenzene crystals removed from a plain steel cooling tube were analyzed as 93.25% para, 6.19% ortho and 0.56% meta. The crystals removed from the polytetrafluoroethylene-covered cooling tube were analyzed as 95.32% para, 4.58% ortho and 0.10% meta.

EXAMPLE 5

About 33,000 grams of a crude nitrochlorobenzene mixture (90.19% para, 9.04% ortho and 0.77% meta) were circulated through the crystallizer for approximately 2⅓ hours while the temperature of the crude mixture was slowly reduced from 80°C. to 74°C. The nitrochlorobenzene crystals removed from a plain steel cooling tube were analyzed as 94.86% para, 4.93% ortho and 0.21% meta. The crystals removed from the polytetrafluoroethylene-covered cooling tube were analyzed as 96.01% para, 3.78% ortho and 0.21% meta.

EXAMPLE 6

About 33,000 grams of a crude nitrochlorobenzene mixture (90.14% para, 9.07% ortho and 0.77% meta) were circulated through the crystallizer for approximately 3⅓ hours while the temperature of the crude mixture was slowly reduced from 81.4°C. to 79.0°C. The nitrochlorobenzene crystals removed from a plain steel cooling tube were analyzed as 96.64% para, 3.22% ortho and 0.09% meta. The crystals removed from the polytetrafluoroethylene-covered cooling tube were analyzed as 99.12% para, 0.85% ortho and 0.03% meta.

EXAMPLE 7

About 33,000 grams of a crude nitrochlorobenzene mixture (90.25% para, 8.94% ortho and 0.81% meta) were circulated through the crystallizer for approximately 3⅓ hours while the temperature of the crude mixture was slowly reduced from 81.7°C. to 78.0°C. The nitrochlorobenzene crystals removed from a plain steel cooling tube were analyzed as 96.97% para, 2.93% ortho and 0.10% meta. The crystals removed from the polytetrafluoroethylene-covered cooling tube were analyzed as 98.45% para, 1.49% ortho and 0.06% meta.

EXAMPLE 8

About 33,000 grams of a crude nitrochlorobenzene mixture (90.21% para, 9.00% ortho and 0.79% meta) were circulated through the crystallizer for approximately 3⅓ hours while the temperature of the crude mixture was slowly reduced from 81.5°C. to 77.0°C. The nitrochlorobenzene crystals removed from a plain steel cooling tube were analyzed as 97.20% para, 2.55% ortho and 0.25% meta. The crystals removed from the polytetrafluoroethylene-covered cooling tube were analyzed as 97.80% para, 2.11% ortho and 0.09% meta.

EXAMPLE 9

About 33,000 grams of a crude nitrochlorobenzene mixture (90.37% para, 8.83% ortho and 0.80% meta) were circulated through the crystallizer for approximately 5 hours while the temperature of the crude mixture was slowly reduced from 81.8°C. to 75.8°C. The nitrochlorobenzene crystals removed from a plain steel cooling tube were analyzed as 97.26% para, 2.61% ortho and 0.13% meta. The crystals removed from the polytetrafluoroethylene-covered cooling tube were analyzed as 99.86% para, 0.14% ortho and <0.05% meta.

EXAMPLE 10

About 33,000 grams of a crude nitrochlorobenzene mixture (90.28% para, 8.91% ortho and 0.81% meta) were circulated through the crystallizer for approximately 6 hours while the temperature of the crude mixture was slowly reduced from 81.5°C. to 74.0°C. The nitrochlorobenzene crystals removed from a plain steel cooling tube were analyzed as 97.65% para, 2.27% ortho and 0.08% meta. The crystals removed from the polytetrafluoroethylene-covered cooling tube were analyzed as 98.77% para, 1.17% ortho and 0.06% meta.

EXAMPLE 11

About 33,000 grams of a crude nitrochlorobenzene mixture (90.32% para, 8.81% ortho and 0.81% meta) were circulated through the crystallizer for approximately 6½ hours while the temperature of the crude mixture was slowly reduced from 80.8°C. to 74.1°C. The nitrochlorobenzene crystals removed from a plain steel cooling tube were analyzed as 97.67% para, 2.23% ortho and 0.10% meta. The crystals removed from the polytetrafluoroethylene-covered cooling tube were analyzed as 98.28% para, 1.63% ortho and 0.09% meta.

EXAMPLE 12

About 33,000 grams of a crude nitrochlorobenzene mixture (91.15% para, 8.08% ortho and 0.77% meta) were circulated through the crystallizer for approximately 6 hours while the temperature of the crude mixture was slowly reduced from 81.8°C. to 73.0°C. The nitrochlorobenzene crystals removed from a plain steel cooling tube were analyzed as 96.48% para, 2.08% ortho and 0.14% meta. The crystals removed from the polytetrafluoroethylene-covered cooling tube were analyzed as 98.86% para, 1.06% ortho and 0.08% meta.

It is to be understood that the present invention is not confined to the preferred combination of a cooling surface (e.g., a metallic tube) and a sleeve or coating of polymeric material. It has also been discovered that a tube of polymeric material, per se, is a cooling surface superior to a steel tube, per se. Thus, it was demonstrated that improved purity can be achieved in the surface crystallization of p-nitrochlorobenzene when using a polytetrafluoroethylene tube, as compared to the purity achieved with a bare steel cooling tube. While it is recognized that cooling tubes of polymeric material may be impractical in many surface crystallization processes for structural reasons, such tubes are within the scope of the present invention.

Although the invention has been described in terms of specified embodiments which are set forth in considerable detail, it should be understood that this is by way of illustration only, and that the invention is not necessarily limited thereto since alternative embodiments and operating techniques will become apparent to those skilled in the art in view of the disclosure. As an example, the preferred embodiments teach that a batch crystallization process was used whereas it is clear that the process as contemplated herein can be applied to a continuous crystallization process. Accordingly, modifications are contemplated which can be made without departing from the spirit of the described invention.

What is claimed is:

1. In a process for separating the isomers of nitro- and halo-substituted aromatic compounds in a liquid isomeric mixture by surface crystallization from the melt, wherein the isomeric mixture is cooled until crystals form on a cooling surface, the improvement comprising conducting the surface crystallization on a cooling surface of polytetrafluoroethylene.

2. In a process of claim 1 for separating para-nitrochlorobenzene from a liquid isomeric mixture of ortho-, meta-, and para-nitrochlorobenzene, the improvement comprising conducting the surface crystallization on a cooling surface of polytetrafluoroethylene.

* * * * *